W. LYMAN, Jr.
Cultivator.
No 35,422.  Patented May 27, 1862.
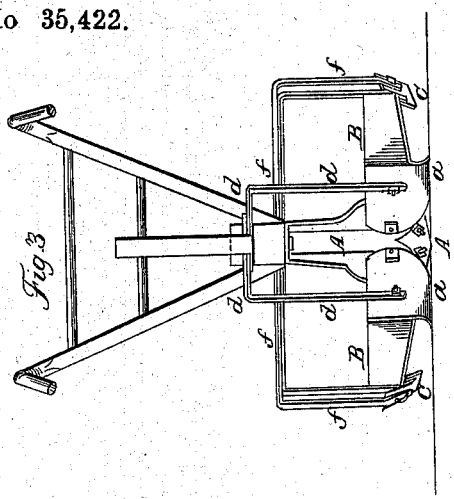
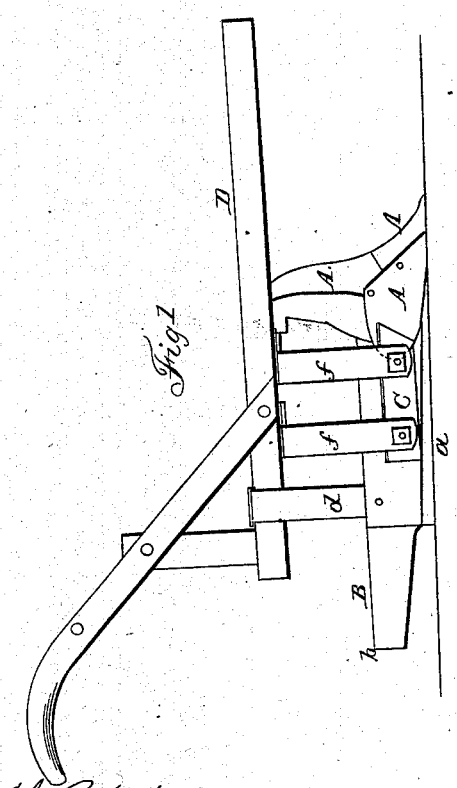
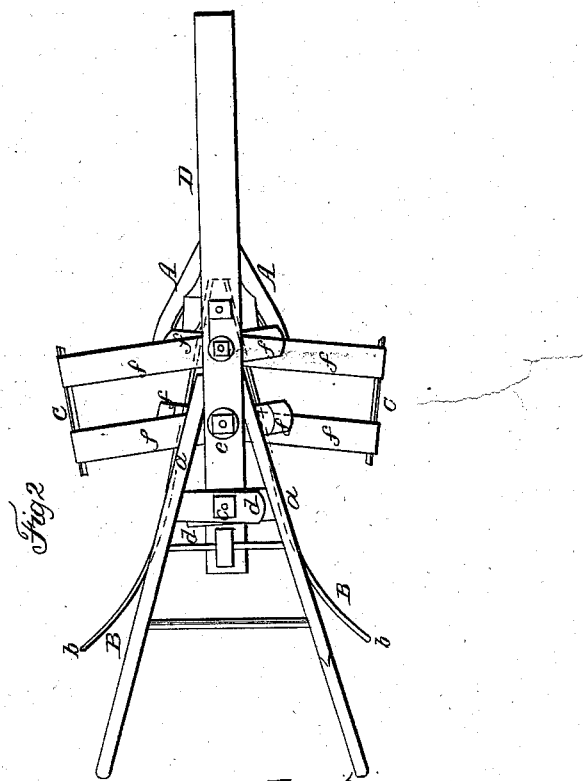

UNITED STATES PATENT OFFICE.

WILLIAM LYMAN, JR., OF MALONE, NEW YORK, ASSIGNOR TO HIMSELF AND SAML. M. WEAD.

IMPROVEMENT IN CULTIVATORS.

Specification forming part of Letters Patent No. 35,422, dated May 27, 1862.

*To all whom it may concern:*

Be it known that I, WILLIAM LYMAN, Jr., of Malone, in the county of Franklin and State of New York, have invented a certain new and useful Improvement in Horse Hoes or Cultivators; and I do hereby declare that the following is a full, clear, and exact description of the same, reference being had to the accompanying drawings, forming a part of this specification, and in which—

Figure 1 represents a side view of the hoe. Fig. 2 represents a top or plan view, and Fig. 3 represents a rear view.

The two long pieces B B, immediately back of the plow A, I call the "long hoes," and the two short pieces C C, attached to the beam D of the plow A, I call the "short hoes." The long hoes being three feet (more or less) long, attached on the inside of the plow by bolts and nuts, make it easy to bring them to any desirable width. The lower edges of the long hoes are intended to project out at the rear end, where the curve commences, and terminate nearly in a point at the end.

The scallops $a$ $a$ are made for forming the bottom of the hill, and the projections $b$ $b$ of the upper edge form the top of the hill.

The short hoes are intended to be about one foot long, and are for the purpose of removing the old earth and weeds from the hill, while the long hoes restore the earth to the hill in quantities at the option of the operator.

The long hoes can be adjusted to suit any width of rows by means of bolt $c$ and arms $d$ $d$, while the short hoes can be adjusted in like manner by means of the bolts $e$ $e$ and their adjusting-arms $f$ $f$. The arms $d$ $d$ and $f$ $f$ are all provided with holes to permit of a ready and easy adjustment. If preferred, the said arms might be slotted out instead of having holes.

The team is to be attached to the beam D in any well-known manner.

By this machine the farmer can cultivate fields in which the rows are wide apart, as well as those in which the rows are close together, a simple adjustment of the hoes only being necessary. Then, again, for hilling, this machine is well adapted, since the long hoes can be so arranged as to hill up to any desired extent, and that, too, without danger of disturbing the bottom of the hill.

Having described my improved horse-hoe, what I claim, and desire to secure by Letters Patent, is—

The combination, with the plow A and beam D, of the long hoes B B, with their adjusting-arms $d$ $d$, and short hoes C C, with their adjusting-arms $f$ $f$, said parts being constructed and arranged to operate in relation to each other, substantially as shown and described.

In witness whereof I have hereunto subscribed my name.

WM. LYMAN, JR.

In presence of—
FREDERICK P. ALLEN,
ASHBEL B. PARMELEE.